May 5, 1953
R. N. WALLACE
2,637,403
PROPELLER SPINNER CONSTRUCTION
WITH BOUNDARY LAYER CONTROL
Filed Dec. 6, 1949
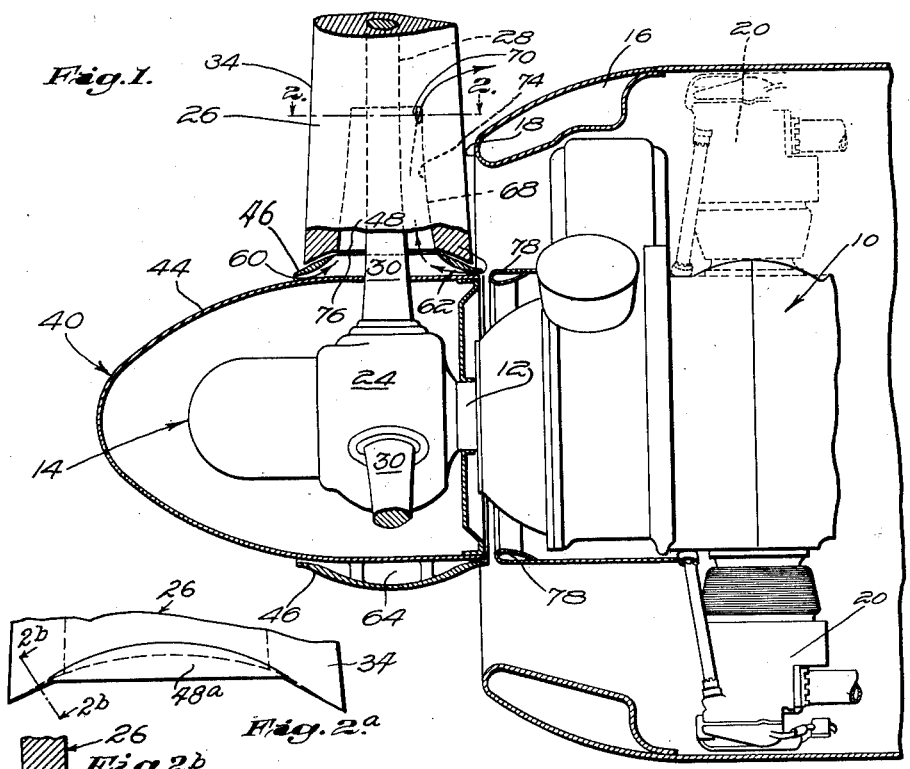
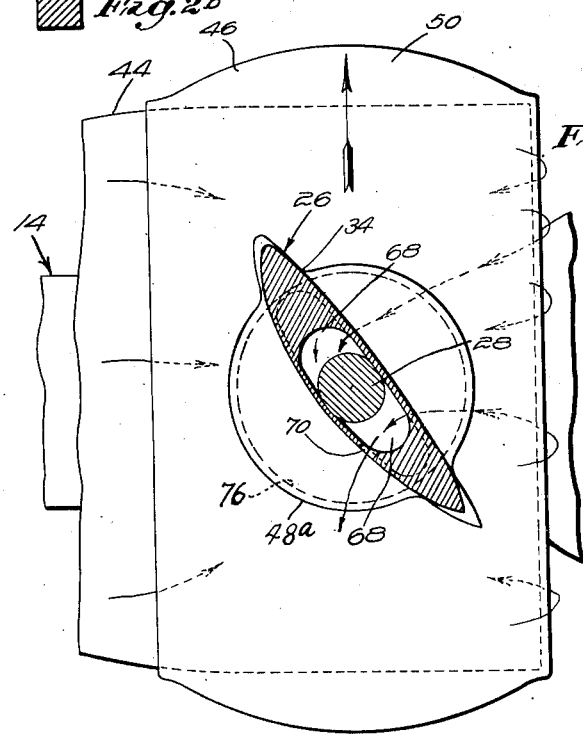
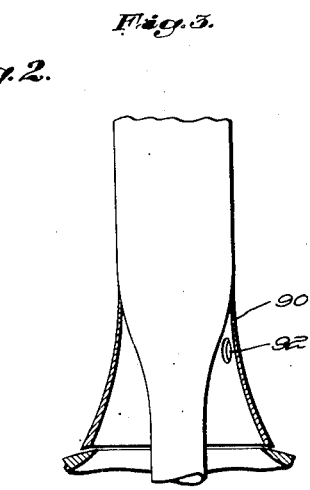
Inventor
Rudolf N. Wallace
by Leonard F. Weklind
Agent Patented May 5, 1953

2,637,403

UNITED STATES PATENT OFFICE 2,637,403

PROPELLER SPINNER CONSTRUCTION WITH BOUNDARY LAYER CONTROL

Rudolf N. Wallace, Glastonbury, Conn., assignor to United Aircraft Corporation, East Hartford, Conn., a corporation of Delaware Application December 6, 1949, Serial No. 131,444

6 Claims. (Cl. 170—135.4)

This invention relates to an aircraft propeller spinner construction and more specifically to an improved spinner for variable pitch propellers.

It is an object of this invention to provide a propeller spinner construction including boundary layer control means for maintaining smooth undisturbed flow around the spinner and the propeller blade roots.

It is another object of this invention to provide an improved spinner construction which surrounds the propeller hub and a portion of the blade shank in combination with an outer spinner shell which forms fore and aft annular slots to remove boundary layer air from the surface of the spinner and shell and thereby maintain smooth air flow.

It is a further object of this invention to provide a spinner of the type described including means for maintaining a substantially sealed relation between the inboard end of the main airfoil portion of the propeller blades and the spinner assembly in the varied pitch positions of the blades.

Another object of this invention is to provide a source of energy for bleeding the boundary layer air from the surface of the spinner assembly described including means utilizing the low pressure area on the camber side of the propeller blades.

These and other objects of the present invention will become readily apparent from the following detailed description of the appended drawing in which, Fig. 1 is a side elevational view in partial cross section illustrating the propeller spinner construction of this invention including the engine cowling and air intake associated therewith; the propeller blade being shown in feathered position for clarity.

Fig. 2 is a cross-sectional view taken substantially along the line 2—2 of Fig. 1 with the propeller blade set in a normal pitch setting.

Fig. 2a is a partial side view of the blade of Fig. 2 better illustrating the disc-like portion at the base thereof.

Fig. 2b is a partial cross-sectional view taken along the line 2b—2b of Fig. 2a to illustrated that the base of the enlarged portion of the blade is curved transversely of its longitudinal axis.

Fig. 3 is a plan view illustrating a solid propeller blade having a cuff adaptable for use with the propeller spinner illustrated in Fig. 1.

Referring to Fig. 1, a power plant is generally indicated at 10, as having a drive shaft 12 for driving a variable pitch propeller generally indicated at 14. The engine 10 has a cowling 16 surrounding the outer periphery thereof and terminating in a forward fluid receiving annular lip 18 adjacent the propeller for inducting coolant air past the engine cylinders, only one of which is shown at 20 for convenience of illustration. Although an air cooled engine is shown, it is to be understood that the cowling 16 may induct air for combustion purposes, oil cooling purposes and the like in a liquid cooled power plant or for a turbine type power unit.

The propeller 14 includes a hub 24 and a plurality of radially extending propeller blades 26 each including a core 28, comprising a blade shank portion 30 and an enlarged main portion 34 of airfoil shape which surrounds, and is fixed to, the core 28.

A spinner 40 surrounds the hub portion 24 of the propeller 14 to direct the air flow in a streamlined manner around the hub and through the blades and includes a main spinner section 44 and a surrounding streamlined outer shell 46 having a length along the propeller rotational axis which is less than the axial length of the main section 44. The main blade portion 34 terminates at its inboard end in a substantially transverse concavely curved surface 48 in order to conform to the streamlined curvature of the adjacent surface of the shell 46. The chordwise edge 48 also includes a disc-like portion 48a (Fig. 2) for reasons set forth hereinafter.

In order to provide a substantially sealed and continued juxtaposed relationship between the edge 48 of the main propeller blade portion 34 and the shell 46, a substantially spherical surface portion 50 (Fig. 2) is provided on the outer surface of the shell 46 adjacent each of the propeller blades 26. The spherical portion 50 extends throughout a great majority of the shell 46 (in the direction of the propeller axis) excepting for the leading and trailing edges thereof. Thus, portion 50 of the shell 46 represents a spherical segment. In this manner the gap which would normally exist between the main propeller blade portion and the spinner in the varied pitch positions of the propeller blade is eliminated so that the air flow over the spinner is maintained substantially undisturbed.

As better seen in Figs. 2a and 2b the disc-like portion 48a as well as the adjacent surface on the inboard end of the enlarged blade portion are curved transversely of the blade axis to conform to the spherical portion 50 mentioned above.

The outer shell 46, which surrounds the main portion 44 of spinner 40, has its fore and aft edges radially spaced from the outer surface of the main spinner section 44 thereby providing fore and aft annular slots 60 and 62, respectively, and an annular chamber 64. The chamber 64 communicates with a hollow passage 68 in each of the propeller blades 26, which passage in turn is vented to the low pressure or camber face of each blade by means of an aperture 70 therein.

During propeller rotation the annular slot 60 may induct the boundary layer region flowing over the forward portion of the main spinner section 44 while the aft annular slot 62 will induct or draw off the boundary layer flowing over the outer surface of the spinner shell 46. Inasmuch as the annular chamber 64 communicates with the low pressure side of the propeller blade 26 a suction will be created therein to continuously induct boundary layer air through the fore and aft annular slots 60 and 62. The air flow from the chamber 64 through the passage 68 and out of the aperture 70 will be further largely enhanced due to centrifugal forces acting on the air during propeller rotation. Since the centrifugal action on the air will be quite powerful within the chamber 64 and also in the passage 68 the wall 74 of the latter may diverge in an inboard direction so as to overlie the opening 76 in the shell 46 through which opening the blade shank 30 extends. In this manner a further boundary layer suction will be provided in the immediate vicinity of the blade inboard edge 48 and the adjacent surface of the shell 46. As a result, further boundary layer energization is provided to increase the flow efficiencies.

In order to insure that the opening 76 in the shell 46 remains continuously closed to communication with the free airstream in the varied pitch positions of the blade, the inboard edge 48 of the blade carries a flared disc-like portion 48a (Fig. 2) which is substantially identical to the opening 76 so as to continuously cover the latter.

In summation, the sources of pressure differential which will coact to energize boundary layer air over the spinner assembly can be described as follows: first, the static pressure difference between the inlets of a flow diverting body such as the annular openings 60 and 62 which openings are located toward the centerline of said body and the pressure at an outlet (such as 76) located at some radial distance from the body centerline will induce flow into such inlet openings; secondly, the centrifugal pumping effect of air confined in a passage extending radially in a rotating member such as a propeller blade will further induce flow in a radial direction; and third the dynamic effect of air flow about the rotating propeller blade produces local low static pressure points about the blade profile at any of which points an outlet can be provided such as 70 to further induce flow into the inlets 60 and 62.

In order to minimize the gap between the aft end of the propeller spinner and the engine nose, an annular fairing 78 may be used to confine the air flow to a smooth flowing pattern.

As shown in Fig. 3, it is apparent that the particular invention described herein may be adapted for use with solid propeller blades by utilizing a cuff 90 adjacent the root or shank end of the propeller blade and providing an aperture 92 on the low pressure surface of the blade and/or the cuff so that the air may flow from the chamber 64 (Fig. 1) internally of the cuff 90 and out of the aperture 92.

As a result of this invention, it is apparent that a propeller spinner construction has been provided which is of simple construction and provides boundary layer control over the spinner surfaces so that smooth unseparated air flow may move past the propeller and into the cowling 16.

Further, as a result of this invention, a simple yet efficient means is provided for insuring a minimum of disturbances at the juncture of the main propeller blade portion and the spinner outer surface.

Although only certain embodiments of this invention have been illustrated and described herein, it is obvious that various modifications and changes may be made in the arrangement and construction of the various parts without departing from the scope of this novel concept.

What it is desired by Letters Patent is:

1. In an aircraft propeller installation comprising a prime mover, a variable pitch propeller driven by said prime mover including a hub and a plurality of blades extending from said hub, and a spinner surrounding said hub, passage means within the confines of each of said blades including an exit therefor and an opening communicating with the outer surface of said spinner for utilizing suction induced by the centrifugal force on the air contained in said passage to draw boundary layer air from the external surface of the spinner.

2. In an aircraft propeller installation comprising a prime mover, a variable pitch propeller driven by said prime mover including a hub and a plurality of blades extending from said hub, and a spinner surrounding said hub, said blades including an enlarged portion terminating adjacent the outer surface of said spinner, said spinner having a spherical outer surface portion adjacent the juncture of each of said propeller blades and said spinner, passage means within the confines of each of said blades including an outboard exit therefor, and an opening adjacent the inboard end of said blades and communicating with said passage means and the outer surface of said spinner for utilizing suction induced by the centrifugal force on the air contained in said passage to draw boundary layer air from the external surface of the spinner in the region aft of the trailing edge of the propeller.

3. A propeller and spinner installation for an aircraft engine including a cowl surrounding said engine and terminating in a forward lip adjacent the propeller, said propeller having a hub and plurality of radially extending variable pitch blades each comprising a core and a covering of airfoil shape fixed to said core, said cover terminating at its inboard end in a transverse concavely curved surface radially spaced in relation to said hub, a spinner for said propeller closely surrounding said hub and extending aft to a terminus adjacent the engine, an outer streamlined shell surrounding said spinner and spaced therefrom thereby forming an annular chamber including fore and aft openings, said shell being of lesser axial length than said spinner and being formed with convexly curved transverse outer surface portions in close proximity to the inboard end of said blade coverings thereby providing juxtaposed relation with said ends in the varied pitch positions of said propeller, a duct in the blade extending radially outboard from said chamber, and an opening in the blade communicating with said duct and an outer surface of said blade.

4. In an induction system for an aircraft power plant, an engine having a variable pitch propeller driven thereby, said propeller having blades each including a shank and main portion thereof, a cowling surrounding said engine and terminating adjacent the propeller in a forward fluid receiving opening, a spinner for the propeller terminating adjacent the engine, and an outer streamlined shell radially spaced from said spinner forming a chamber therebetween including fore and aft annular openings, said shell and the inboard end of said main portion including substantially spherical surfaces in juxtaposed relation with each other whereby a continuous streamlined relation is maintained therebetween in the varied pitch positions of said blades, said blades including means for maintaining substantially uniform flow through said propeller and into said fluid receiving cowl opening including an aperture on the face of said blades which is normally under low pressure and fluid passages in said blades interconnecting said aperture with said chamber.

5. A propeller having a plurality of variable pitch blades each having an inboard shank portion and an enlarged main portion extending radially outboard from said shank portion, in combination with a spinner at the inner ends of said blades, an outer shell embracing said spinner, said shell being formed with a spherical surface adjacent the inboard end of the main portion of each of the blades, each of said main blade portions terminating in an inboard end which substantially conforms to the contour of said shell whereby the blade mates with said spherical surface in juxtaposed relation in all of the varied pitch positions, said shell being radially spaced from said spinner forming an annular chamber therebetween including fore and aft annular openings, and a passageway in said main portion extending radially outboard from the inboard end of said main portion, said passageway communicating at its inboard end with said annular chamber and at its outboard end with the outer surface of said blade whereby during rotation of the propeller the inboard portion of the blade acts as a centrifugal pump for removing boundary layer air from said spinner and shell through said fore and aft openings.

6. A propeller having a plurality of variable pitch blades each having an inboard shank portion and an enlarged main portion extending radially outboard from said shank portion, in combination with a spinner at the inner ends of said blades, an outer shell embracing said spinner, said shell being formed with a spherical surface adjacent the inboard end of the main portion of each of the blades, each of said main blade portions terminating at its inboard end in a transverse concavely curved surface conforming to the curvature of said shell in the varied pitch positions of said blade, said shell being radially spaced from said spinner forming an annular chamber therebetween including at least one annular opening for inducting boundary layer flow from the outer surface of said spinner, said blade being formed with a passage extending radially outboard and communicating with said annular chamber, and an opening in the wall of said blade spaced radially outward from said chamber communicating with said passage.

RUDOLF N. WALLACE.

References Cited in the file of this patent

UNITED STATES PATENTS

| Number | Name | Date |
|---|---|---|
| 1,945,071 | Popp | Jan. 30, 1934 |
| 2,018,012 | Chilton | Oct. 22, 1935 |
| 2,426,635 | Mercier | Sept. 2, 1947 |
| 2,443,808 | Stalker | June 22, 1948 |

FOREIGN PATENTS

| Number | Country | Date |
|---|---|---|
| 227,151 | Great Britain | Jan. 12, 1925 |
| 431,728 | Germany | July 19, 1926 |